US010721400B2

(12) United States Patent
Fang

(10) Patent No.: US 10,721,400 B2
(45) Date of Patent: Jul. 21, 2020

(54) SPHERICAL CAMERA

(71) Applicant: Hangzhou Hikvision Digital Technology Co., Ltd., Zhejiang (CN)

(72) Inventor: Zhiqiang Fang, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 16/330,802

(22) PCT Filed: Feb. 8, 2018

(86) PCT No.: PCT/CN2018/075744
§ 371 (c)(1),
(2) Date: Mar. 6, 2019

(87) PCT Pub. No.: WO2018/223725
PCT Pub. Date: Dec. 13, 2018

(65) Prior Publication Data
US 2019/0238750 A1    Aug. 1, 2019

(30) Foreign Application Priority Data

Jun. 8, 2017 (CN) .......................... 2017 2 0663596
Jun. 8, 2017 (CN) .......................... 2017 2 0663727
Jun. 14, 2017 (CN) .......................... 2017 2 0692624

(51) Int. Cl.
*H04N 5/232* (2006.01)
*H04N 5/225* (2006.01)
*G08B 13/196* (2006.01)

(52) U.S. Cl.
CPC ..... *H04N 5/23238* (2013.01); *G08B 13/1963* (2013.01); *H04N 5/225* (2013.01); *H04N 5/2252* (2013.01)

(58) Field of Classification Search
CPC ................................................... H04N 5/23238
(Continued)

(56) References Cited

U.S. PATENT DOCUMENTS

2001/0047743 A1* 12/2001 Raad .................... F16M 11/126
109/50
2006/0023113 A1 2/2006 Lin
(Continued)

FOREIGN PATENT DOCUMENTS

CN    204031281    12/2014
CN    104284072    1/2015
(Continued)

OTHER PUBLICATIONS

Extended European Search Report received in connection with European Application No. 18813749.1, dated Aug. 19, 2019, 7 pages.
(Continued)

*Primary Examiner* — Joel W Fosselman
(74) *Attorney, Agent, or Firm* — Meunier Carlin & Curfman LLC

(57) ABSTRACT

The present application discloses a spherical camera, including a base, a rotation assembly, a sphere locking frame, a sphere and a sphere cover, wherein the sphere cover is connected to the base through the rotation assembly, and is rotatable relative to the base in a direction parallel to a supporting surface of the base; the sphere is hinged in the sphere cover and is rotatable in a direction perpendicular to the supporting surface; the sphere locking frame is provided on the rotation assembly and an elastic damping member is provided between the sphere and the sphere locking frame. The above solutions can solve the problem that the sphere of the current spherical camera can be easily damaged due to direct contact with the cover during a rotation process.

20 Claims, 7 Drawing Sheets

(58) Field of Classification Search
USPC .......................................................... 348/373
See application file for complete search history.

(56) References Cited

U.S. PATENT DOCUMENTS

| | | | |
|---|---|---|---|
| 2011/0033179 A1 | 2/2011 | Sasaki | |
| 2011/0310293 A1* | 12/2011 | Yamauchi | G03B 15/00 |
| | | | 348/373 |
| 2015/0356841 A1 | 12/2015 | Lim | |
| 2016/0119513 A1 | 4/2016 | Sasaki | |
| 2016/0182783 A1* | 6/2016 | Basho | H04N 5/2251 |
| | | | 348/374 |

FOREIGN PATENT DOCUMENTS

| | | |
|---|---|---|
| CN | 104653975 | 5/2015 |
| CN | 206807604 | 12/2017 |
| EP | 3041214 A1 | 7/2016 |

OTHER PUBLICATIONS

International Search Report (English) and Written Opinion dated Apr. 20, 2018, from International Application No. PCT/CN2018/075744, 9 pages.

\* cited by examiner

SPHERICAL CAMERA

The present application claims the priorities to a Chinese Patent Application No. 201720663727.7 entitled "Spherical camera" and a Chinese Patent Application No. 201720663596.2 entitled "Spherical camera", filed with the State Intellectual Property Office of the People's Republic of China on Jun. 8, 2017, and further claims the priority to a Chinese Patent Application No. 201720692624.3 entitled "Camera" and filed with the State Intellectual Property Office of the People's Republic of China on Jun. 14, 2017, which are incorporated herein by reference in their entireties.

TECHNICAL FIELD

The present application relates to the technical field of a camera, and in particular to a spherical camera.

BACKGROUND

With the development of the society, there are more and more kinds of cameras, and spherical cameras are widely used. The spherical camera includes a sphere. The spherical camera usually has a plurality of camera lenses which are arranged on the sphere according to a certain rule. Each camera lens can capture images. The spherical camera can stitch the images captured by each camera lens to form an image with a larger field of view.

A spherical camera usually includes a base, a sphere, and an outer cover, wherein the sphere is provided on the base for mounting. The sphere is rotatable in a direction parallel to the supporting surface of the base (also referred to as a P direction herein) and a direction perpendicular to the supporting surface of the base (also referred to as a T direction herein), thereby achieving the purpose of adjusting the shooting angle of the camera lens. However, in the current spherical camera, there is direct contact between the sphere and the outer cover. During the rotation of the sphere in the direction perpendicular to the supporting surface of the base, the sphere gradually contacts with the outer cover, thereby causing the outer cover to limit the rotation of the sphere within a set angle range. Obviously, direct contact between the sphere and the outer cover will generate friction, which makes the sphere to be easily damaged.

SUMMARY

An embodiment of the present application provides a spherical camera to solve the problem that the sphere of the current spherical camera can be easily damaged due to direct contact with the cover during a rotation process.

In order to solve the above problem, the following technical solutions are applied in the embodiment of the present application.

A spherical camera includes a base, a rotation assembly, a sphere locking frame, a sphere and a sphere cover, wherein the sphere cover is connected to the base through the rotation assembly and is rotatable relative to the base in a direction parallel to a supporting surface of the base; the sphere is hinged in the sphere cover and is rotatable in a direction perpendicular to the supporting surface; the sphere locking frame is provided on the rotation assembly and an elastic damping member is provided between the sphere and the sphere locking frame.

Optionally, in the above spherical camera, an inner wall of the sphere cover is provided with a recess, and one end of the hinge shaft of the sphere is connected to the sphere, and the other end is mounted in the recess, so as to cause the sphere to rotate in the direction perpendicular to the supporting surface.

Optionally, in the above spherical camera, the hinge shaft includes a fixed shaft and a rotating shaft, one end of the fixed shaft is clamped in the recess, and one end of the rotating shaft is rotatably connected with the other end of the fixed shaft, and the other end of the rotating shaft is fixedly connected with the sphere.

Optionally, in the above spherical camera, the rotating shaft and a part of the fixed shaft are placed within the sphere.

Optionally, in the above spherical camera, the base includes a cylindrical body and a mounting disk; and the mounting disk is provided on a side of the cylindrical body facing away from the sphere, an inner cavity of the cylindrical body is a line accommodating cavity.

Optionally, in the above spherical camera, the rotation assembly is mounted on a side of the cylindrical body facing toward the sphere, and the rotation assembly is provided with an avoidance hole communicating with the line accommodating cavity.

Optionally, in the above spherical camera, the rotation assembly includes a turntable metal plate and a rotating turntable, the turntable metal plate is fixed on the cylindrical body, the rotating turntable and the cylindrical body forms a revolute pair, and the rotating turntable is fixedly connected with the sphere locking frame.

Optionally, in the above spherical camera, further includes a base cover that is fixed on a side of the cylindrical body facing toward the sphere to close the line accommodating cavity, the base cover is provided with a threading hole communicating with the avoidance hole and the line accommodating cavity.

Optionally, in the above spherical camera, further includes a sphere cover decoration piece, the sphere cover is provided with an avoidance opening for avoiding a camera lens of the sphere, and the sphere cover decoration piece is plugged in a gap between the edge of the avoidance opening and the sphere.

Optionally, in the above spherical camera, the elastic damping member is a silicone rubber damping member.

Optionally, in the above spherical camera, one end of the sphere locking frame is fixed on the rotation assembly, and the other end is a cantilever structure; the elastic damping member is provided between the cantilever structure and the sphere; a threaded locking member is provided on the sphere cover, and the cantilever structure is provided with a threaded hole that is in thread engagement with the threaded locking member; and the base is provided with an annular recess; the rotation assembly is provided with a through hole, within which an elastic stretchable member is provided; one end of the elastic stretchable member is connected with a screw-in end of the threaded locking member, and the other end is connected with a brake block that is engageable with the annular recess, the brake block and the annular recess can be positioned in a rotation direction of the sphere cover parallel to the supporting surface; with the movement of the screw-in end, the elastic stretchable member can drive the brake block to be engaged with the annular recess or to be separate from the annular recess; the threaded locking member cooperates with the threaded hole to control a braking engagement or separating of the elastic damping member and the sphere through deformation of the cantilever structure.

Optionally, in the above spherical camera, further includes an intermediate moving block, the intermediate moving block is slidably provided in the through hole and abuts between the screw-in end and the elastic stretchable member.

Optionally, in the above spherical camera, the elastic stretchable member is a coil spring.

Optionally, in the above spherical camera, an inner wall of the sphere cover is provided with a recess, and one end of the hinge shaft of the sphere is connected to the sphere, and the other end is mounted in the recess, so as to cause the sphere to rotate in the direction perpendicular to the supporting surface.

Optionally, in the above spherical camera, the hinge shaft includes a fixed shaft and a rotating shaft, one end of the fixed shaft is clamped in the recess, and one end of the rotating shaft is rotatably connected with the other end of the fixed shaft, and the other end of the rotating shaft is fixedly connected with the sphere.

Optionally, in the above spherical camera, the rotating shaft and a part of the fixed shaft are placed within the sphere.

Optionally, in the above spherical camera, the base includes a cylindrical body and a mounting disk; and the mounting disk is provided on a side of the cylindrical body facing away from the sphere, an inner cavity of the cylindrical body is a line accommodating cavity.

Optionally, in the above spherical camera, the rotation assembly is mounted on a side of the cylindrical body facing toward the sphere, and the rotation assembly is provided with an avoidance hole communicating with the line accommodating cavity.

Optionally, in the above spherical camera, the rotation assembly includes a turntable metal plate and a rotating turntable, the turntable metal plate is mounted on the cylindrical body, the rotating turntable and the cylindrical body forms a revolute pair, and the rotating turntable is fixedly connected with one end of the sphere locking frame.

Optionally, in the above spherical camera, further includes a base cover that is fixed on a side of the cylindrical body facing toward the sphere to close the line accommodating cavity, the base cover is provided with a threading hole communicating with the avoidance hole and the line accommodating cavity.

Optionally, in the above spherical camera, further includes a sphere cover decoration piece, the sphere cover is provided with an avoidance opening for avoiding a camera lens of the sphere, and the sphere cover decoration piece is plugged in a gap between the edge of the avoidance opening and the sphere.

Optionally, in the above spherical camera, the elastic damping member is a silicone rubber damping member.

Optionally, in the above spherical camera, one end of the brake block is a brake tip, the other end is connected with the elastic stretchable member, and the brake tip is engageable with the annular recess.

The above at least one technical solution applied in the embodiments of the present application can achieve the following beneficial effects.

In the spherical camera disclosed in the embodiment of the present application, the sphere is mounted in the sphere cover, and is rotatable in the direction perpendicular to the supporting surface of the base. The sphere cover is provided on the base through the rotation assembly, so that the sphere cover drives the sphere to rotate in the direction parallel to the supporting surface of the base. When the sphere rotates in the direction perpendicular to the supporting surface, it can closely contact with the elastic damping member, thereby achieving the purpose of limiting the rotation of the sphere within the set angle range. The elastic damping member has a better elastic damping effect and can reduce the frictional damage to the sphere. It can be seen that the spherical camera disclosed in the embodiment of the present application can solve the problem that the sphere of the current spherical camera can be easily damaged due to direct contact with the sphere cover and then brake during a rotation process.

The above at least one technical solution applied in the embodiments of the present application can achieve the following beneficial effects.

In the spherical camera disclosed in the embodiment of the present application, the sphere cover is connected to the base through the rotation assembly, and is rotatable in a direction parallel to the supporting surface of the base (i.e., P direction), and the sphere is hinged within the sphere cover, and is rotatable in a direction perpendicular to the supporting surface (i.e., T direction). The threaded locking member can be in thread engagement with the threaded hole on the cantilever structure of the sphere locking frame. Screwing in the threaded locking member causes the threaded locking member to pull the cantilever structure, and thus causes the cantilever structure to generate a deformation towards the sphere. The above deformation of the cantilever structure will press the elastic damping member, so that the elastic damping member closely contacts with the sphere to prevent the sphere from rotating in the direction perpendicular to the supporting surface of the base. Screwing in the threaded locking member will cause the screw-in end to push toward the elastic stretchable member. The elastic stretchable member will be compressed and thus drive the brake block to be engaged with the annular recess, and eventually prevent the sphere cover from driving the sphere to rotate relative to the base, also realizing the rotation locking of the sphere in a direction parallel to the supporting surface of the base. During the screwing out process of the threaded locking member, the actions of the threaded locking member on the cantilever structure and the elastic stretchable member are eliminated, so that the locking is released.

Through the above working process, it can be seen that the user only needs to operate the threaded locking member to achieve the locking or unlocking in the P direction and the T direction, which can achieve the locking control more conveniently compared with the prior art in which the locking or unlocking in the P direction and the T direction is achieved by two locking screws respectively, thus the purpose of improving the locking efficiency is achieved. It can be seen that the spherical camera disclosed in the embodiment of the present application can solve the problem present in the current spherical cameras that it is inconvenient to operate two locking screws to realize the locking operations in the P direction and the T direction.

BRIEF DESCRIPTION OF THE DRAWINGS

In order to more clearly describe the technical solutions of the embodiments of the present application and of the prior art, drawings that need to be used in the embodiments and the prior art will be briefly described below. Obviously, the drawings provided below are for only some embodiments of the present application; those skilled in the art can also obtain other drawings based on these drawings without any creative efforts.

DESCRIPTION OF THE REFERENCE SIGNS

Figure 10:
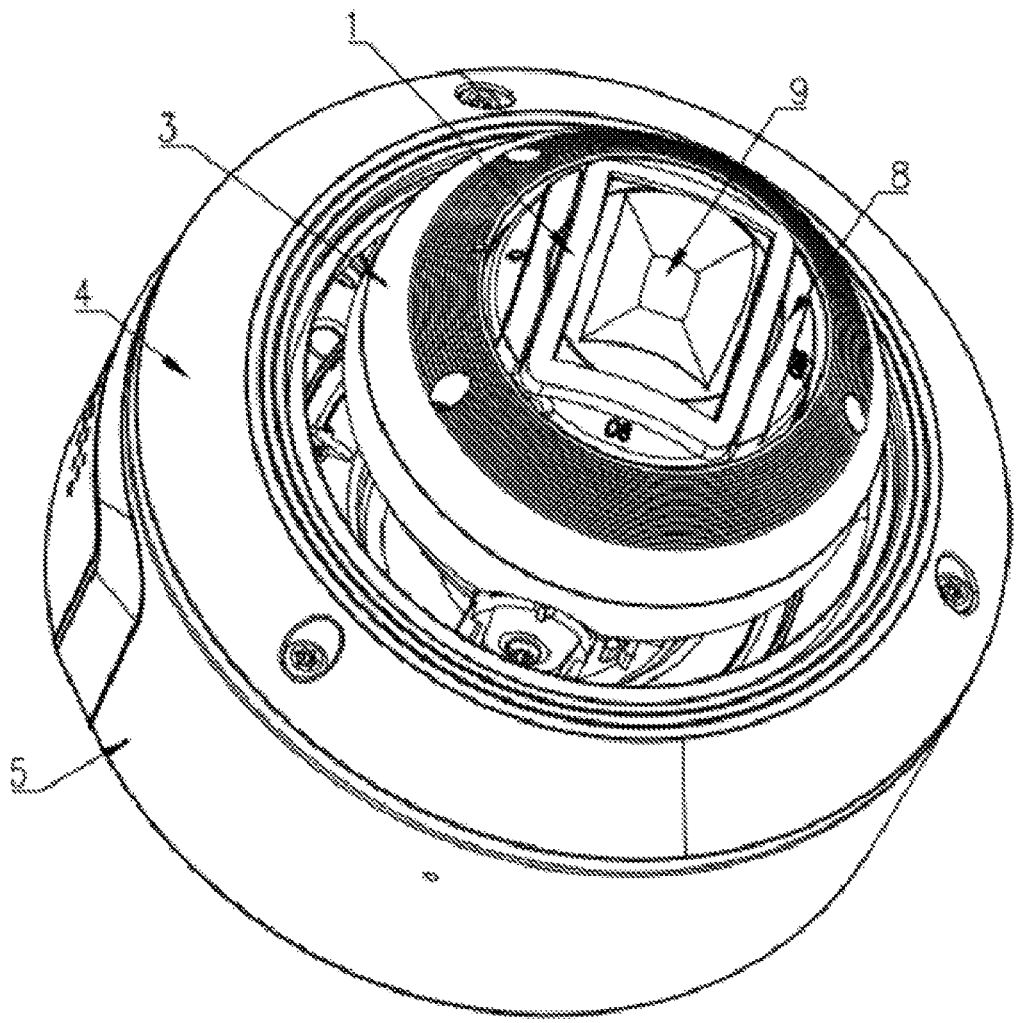
Figure 11:
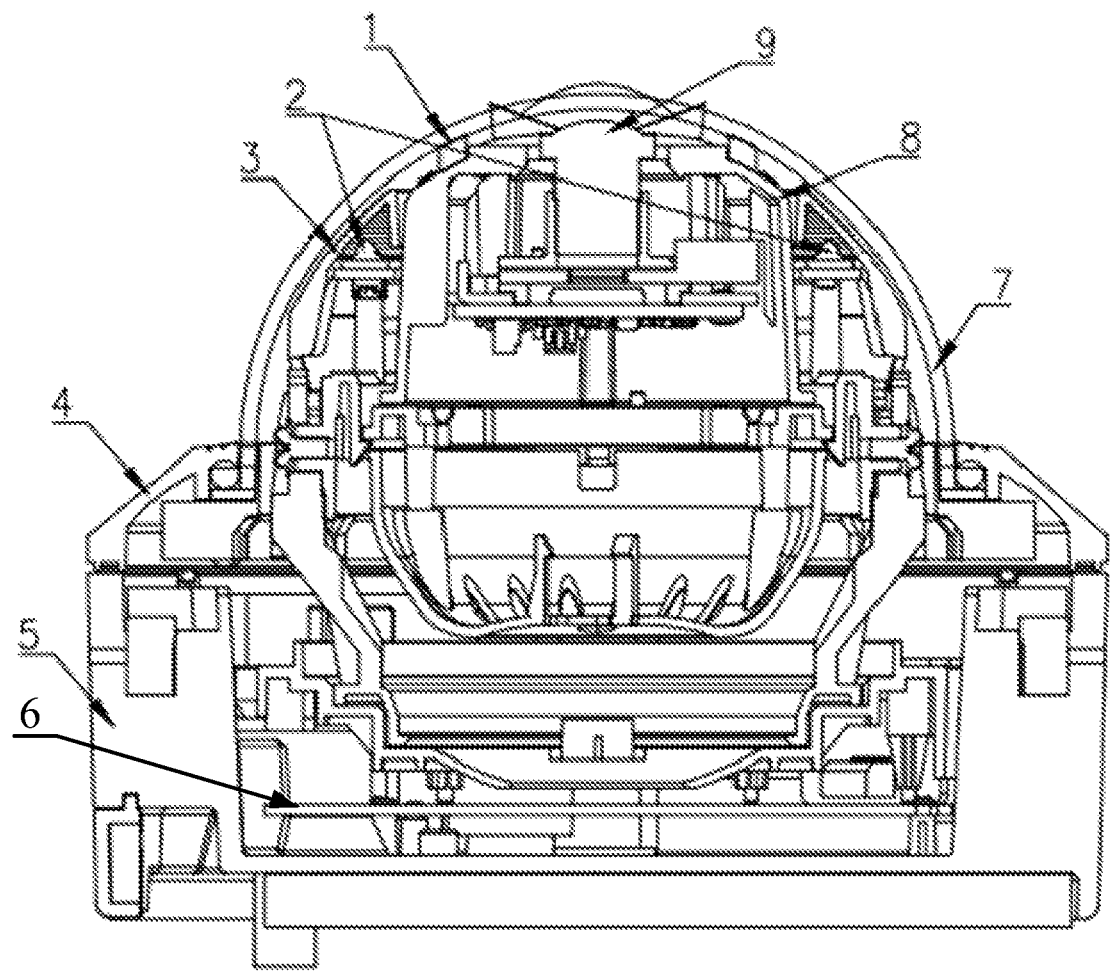
Figure 12:
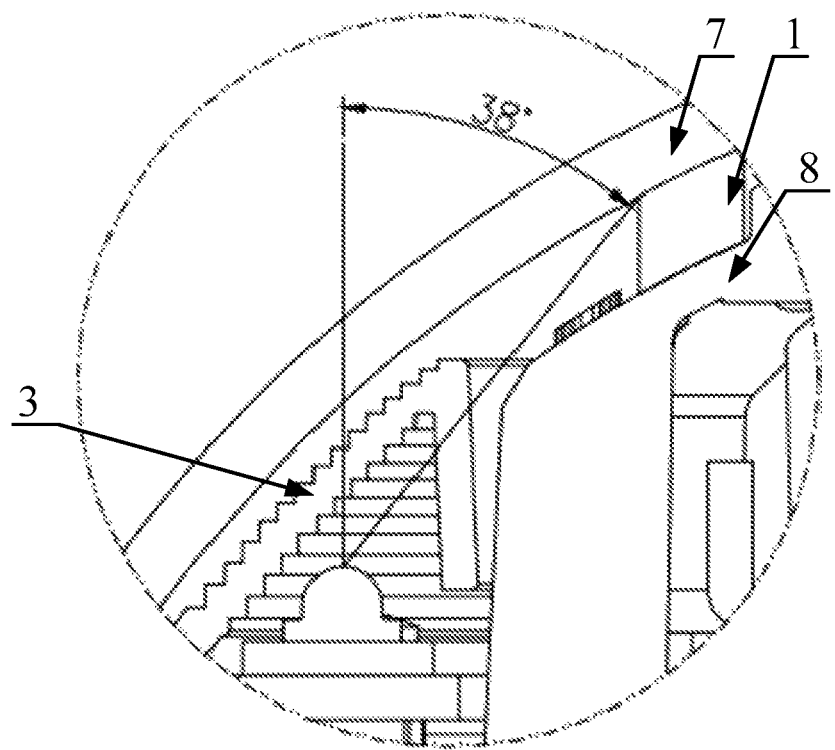

100—base, 110—cylindrical body, 120—mounting disk, 130—base cover, 131—threading hole, 200—rotation assembly, 210—avoidance hole, 220—turntable metal plate, 230—rotating turntable, 300—sphere locking frame, 310—cantilever structure, 400—sphere, 410—hinge shaft, 500—sphere cover, 510—recess, 600—elastic damping member, 700—sphere cover decoration piece, 800—threaded locking member, 900—elastic stretchable member, 910—brake block, 920—intermediate moving block;

FIG. 10 is a structural diagram of a camera disclosed in an embodiment of the present application;

FIG. 11 is a sectional view of a camera disclosed in an embodiment of the present application;

FIG. 12 is a partial enlarged structural diagram of FIG. 11.

DESCRIPTION OF THE REFERENCE SIGNS

1—light—blocking separator, 2—light supplement lamp, 3—lamp cover, 4—front shell, 5—base, 6—main board, 7—transparent cover, 8—front end cover, 9—lens.

DETAILED DESCRIPTION

In order to make the objectives, technical solutions, and advantages of the present application clearer and more understandable, the present application will be described in more detail below with reference to the accompanying drawings and embodiments. Obviously, the described embodiments are only some rather than all of the embodiments of the present application. All other embodiments obtained based on the embodiments of the present application by those skilled in the art without any creative efforts fall within the scope of protection of the present application.

The technical solutions provided by various embodiments of the present application will be described in detail with reference to the accompanying drawings.

Figure 1:
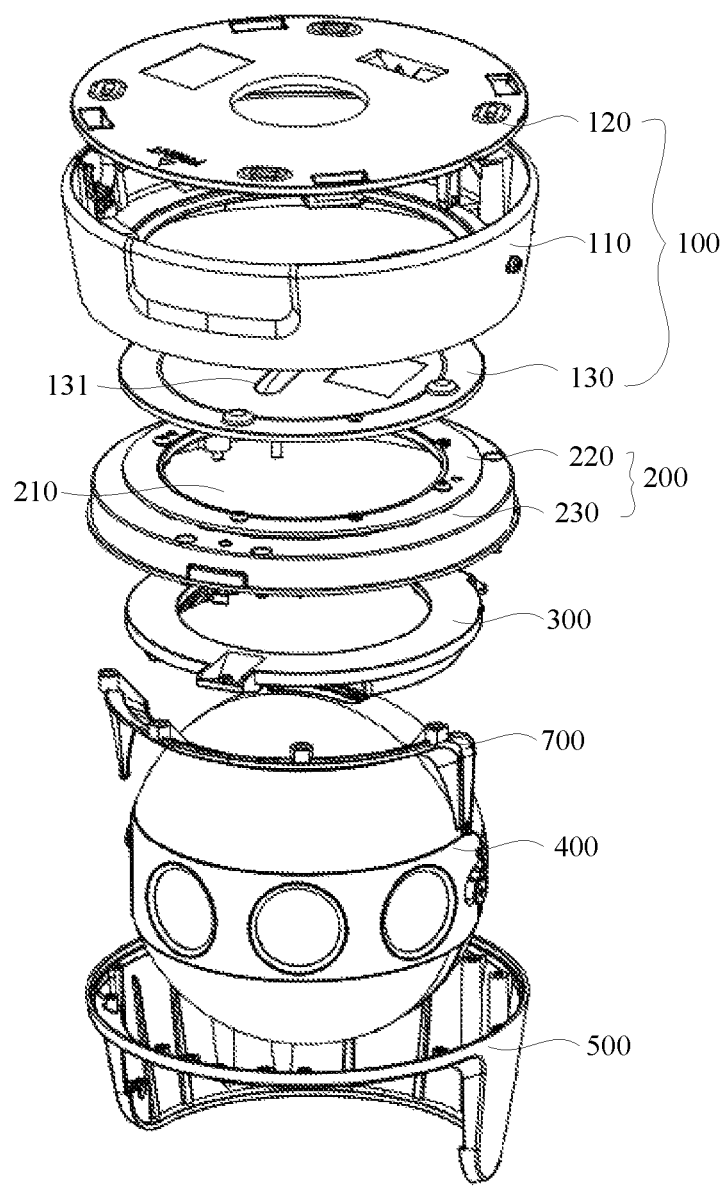
FIG. 1 is an exploded structural diagram of a spherical camera disclosed in an embodiment of the present application.
Figure 2:
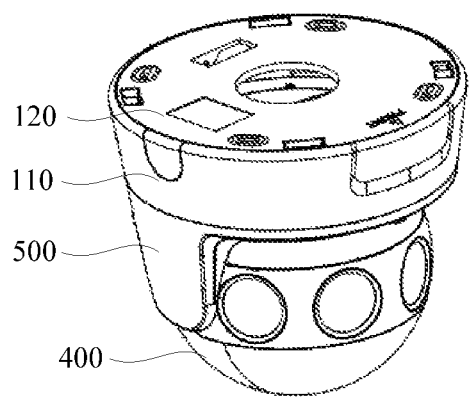
FIG. 2 is a structural diagram of a spherical camera disclosed in an embodiment of the present application.

An embodiment of the present application discloses a spherical camera. As shown in FIGS. 1 and 2, the spherical camera includes a base 100, a rotation assembly 200, a sphere locking frame 300, a sphere 400, and a sphere cover 500.

Figure 3:
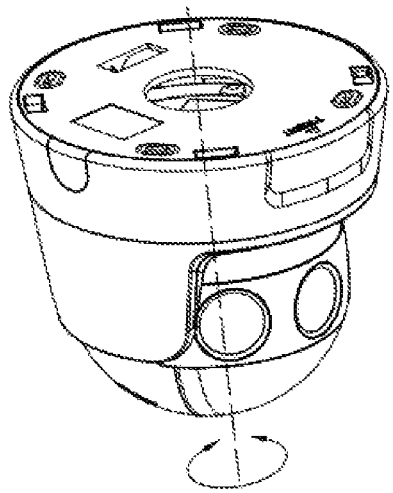
FIG. 3 is a structural diagram illustrating the sphere of the spherical camera shown in FIG. 2 rotates through an angle in a direction parallel to the supporting surface of the base.
Figure 4:
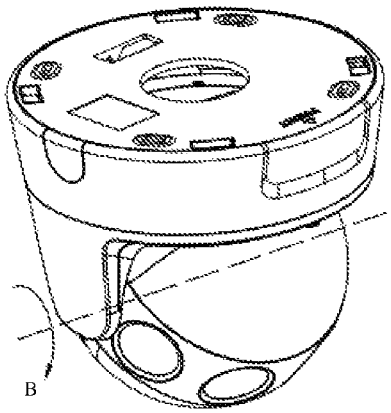
FIG. 4 is a structural diagram illustrating the sphere of the spherical camera shown in FIG. 2 rotates through an angle in a direction perpendicular to the supporting surface of the base.

The sphere cover 500 is connected to the base 100 through the rotation assembly 200 so as to be rotatable relative to the base 100. The sphere cover 500 is rotatable relative to the base 100 in a direction parallel to the supporting surface of the base 100, as shown in FIG. 3. The sphere 400 is hinged in the sphere cover 500 and is rotatable in a direction perpendicular to the supporting surface of the base 100, as shown in FIG. 4. The sphere locking frame 300 is provided on the rotation assembly 200, and an elastic damping member 600 is provided between the sphere 400 and the sphere locking frame 300. The elastic damping member 600 closely contacts with the sphere 400 when the sphere 400 rotates perpendicularly to the supporting surface of the base 100, so as to achieve the limitation of the range of the rotation angle of the sphere 400.

In the spherical camera disclosed in the embodiment of the present application, the sphere 400 is mounted in the sphere cover 500 and is rotatable in a direction perpendicular to the supporting surface of the base 100. The sphere cover 500 is provided on the base 100 through the rotation assembly 200, so that the sphere cover 500 drives the sphere 400 to rotate in the direction parallel to the supporting surface of the base 100. When the sphere 400 rotates in the direction perpendicular to the supporting surface, it can closely contact with the elastic damping member 600, thereby achieving the purpose of limiting the rotation of the sphere 400 within the set angle range. The elastic damping member 600 has a better elastic damping effect and can reduce the frictional damage to the sphere 400. It can be seen that the spherical camera disclosed in the embodiment of the present application can solve the problem that the sphere of the current spherical camera can be easily damaged due to direct contact with the sphere cover and then brake during a rotation process.

Figure 5:
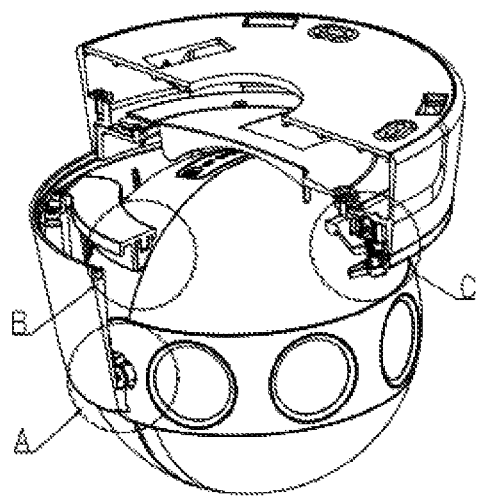
FIG. 5 is a partial sectional view of the spherical camera shown in FIG. 2.
Figure 6:
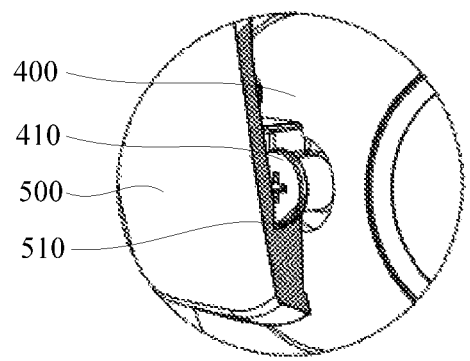
FIG. 6 is an enlarged structural diagram of part A of FIG. 5.
Figure 7:
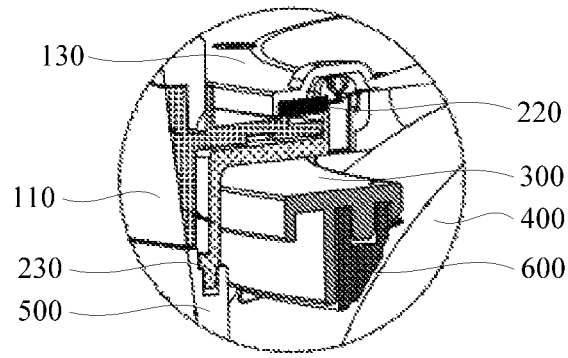
FIG. 7 is an enlarged structural diagram of part B of FIG. 5.

Referring to FIGS. 5-7, in this embodiment of the present application, the spherical camera further includes a hinge shaft 410. The inner wall of the sphere cover 500 can be provided with a recess 510. One end of the hinge shaft 410 is connected to the sphere 400, and the other end is mounted in the recess 510, so that the sphere 400 is rotated in the direction perpendicular to the supporting surface of the base 100.

Specifically, the hinge shaft 410 includes a fixed shaft and a rotating shaft. One end of the fixed shaft is clamped in the recess 510. One end of the rotating shaft is rotatably connected with the other end of the fixed shaft. The other end of the rotating shaft is fixedly connected with the sphere 400. For example, the fixed shaft and the rotating shaft are sleeved and engaged to form a revolute pair therebetween. In this way, one end of the rotating shaft and the other end of the fixed shaft are rotatably connected. In order to improve the compactness of the assembly and reduce the volume of the spherical camera, specifically, the rotating shaft and a part of the fixed shaft can be placed within the sphere 400.

Referring again to FIG. 1, the base 100 is a base of the spherical camera that provides a mounting base for other components. In a specific implementation, the base 100 can include a cylindrical body 110 and a mounting disk 120. The mounting disk 120 is provided on a side of the cylindrical body 110 facing away from the sphere 400, and the inner cavity of the cylindrical body 110 is a line accommodating cavity. Cables of the spherical camera can be placed in the line accommodating cavity to hide lines. The rotation assembly 200 is mounted on a side of the cylindrical body 110 facing toward the sphere 400. The rotation assembly 200 is provided with an avoidance hole 210 communicating with the line accommodating cavity, so as not to affect cable threading of the sphere 400 of the spherical camera.

The rotation assembly 200 is a component for achieving the rotation of the sphere 400 parallel to the supporting surface of the base 100. There are many kinds of mechanisms for achieving the functions of the rotation assembly 200. A specific implementation is that the rotation assembly 200 can include a turntable metal plate 220 and a rotating turntable 230, wherein the turntable metal plate 220 is fixed on the cylindrical body 110, the rotating turntable 230 and the cylindrical body 110 constitute a revolute pair, and the rotating turntable 230 is fixedly connected with the sphere locking frame 300. The turntable metal plate 220 can increase the connection strength. Of course, other intermediate connectors can also be used as the connector of the rotating turntable 230.

After the assembly is completed, cables in the line accommodating cavity will be dropped between the sphere 400 and the sphere cover 500 through the cylindrical body 110 and the avoidance hole 210 of the rotation assembly 200, thus the rotation of the sphere 400 would be affected. Based on this, the spherical camera disclosed in the embodiment of the present application can further include a base cover 130. The base cover 130 is fixed on the side of the cylindrical body 110 facing toward the sphere 400 to close the line accommodating cavity, and the base cover 130 is provided with a threading hole 131 communicating with the avoidance hole 210 and the line accommodating cavity. The base cover 130 can prevent the cables from falling out of the line accommodating cavity into the gap between the sphere cover 500 and the sphere 400 without affecting the threading of the cables.

In the embodiment of the present application, the elastic damping member 600 is made of an elastic material, and the elastic damping member may be a silicone rubber damping member.

The sphere cover 500 is used for mounting the sphere 400. Of course, in order not to affect the shooting of the camera lens on the sphere 400, the sphere cover 500 can be provided with an avoidance opening. Since the sphere 400 is rotatable relative to the sphere cover 500, there is a gap therebetween. In order to improve the compactness of the assembly of the spherical camera and to prevent foreign matters from entering into the gap and thus affecting the rotation of the sphere 400, optionally, the spherical camera disclosed in the embodiment of the present application can further include a sphere cover decoration piece 700. The sphere cover decoration piece 700 is plugged in a gap between the edge of the avoidance opening and the sphere 400, thus playing a role of plugging.

As described above, the sphere is rotatable in a direction parallel to the supporting surface of the base (also referred to as a P direction) and a direction perpendicular to the supporting surface of the base (also referred to as a T direction), thereby achieving the purpose of adjusting the shooting angle of the camera lens. In the existing solutions, locking screws are provided for the P-direction and T-direction locking of the spherical camera, thereby achieving the locking respectively. During the locking process, a user needs to operate two locking screws to achieve the locking of the sphere in the P direction and T direction, respectively. Operating the two locking screws has a problem of inconvenient operation and affects the locking efficiency.

The following embodiment provides a spherical camera to solve the problem that it is inconvenient to operate the two locking screws for the current spherical cameras.

Figure 8:
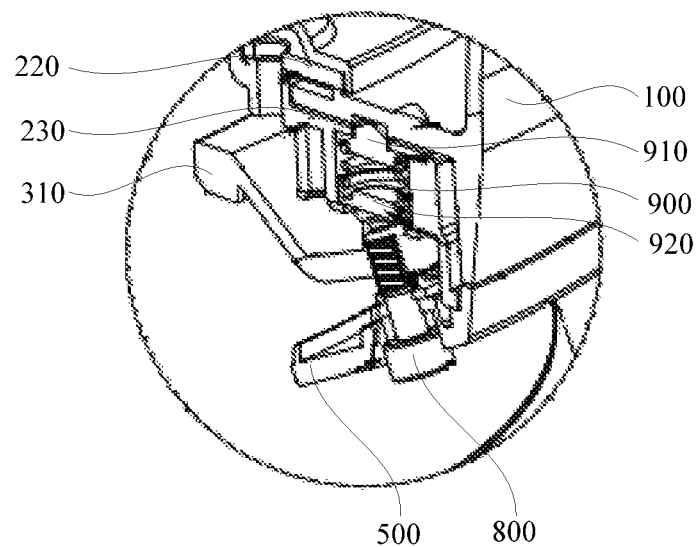
FIG. 8 is an enlarged structural diagram of part C of FIG. 5 in one working state.
Figure 9:
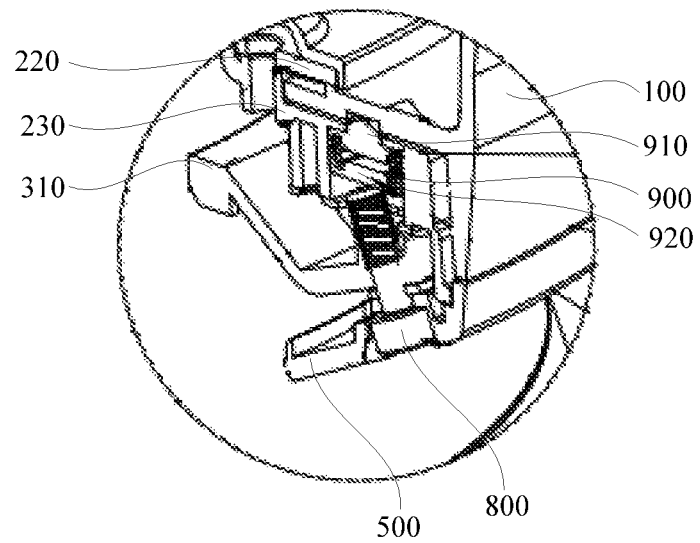
FIG. 9 is an enlarged structural diagram of part C of FIG. 5 in another working state.

Referring to FIGS. 7-9, one end of the sphere locking frame 300 is fixed on the rotation assembly 200, and the other end is a cantilever structure 310. A elastic damping member 600 is provided between the cantilever structure 310 and the sphere 400.

A threaded locking member 800 is provided on the sphere cover 500. The cantilever structure 310 is provided with a threaded hole in thread engagement with the threaded locking member 800. An annular recess is provided on the base 100, and is generally parallel to the supporting surface of the base 100.

The rotation assembly 200 is provided with a through hole, within which an elastic stretchable member 900 is provided. The elastic stretchable member 900 may be a member with good elastic stretchable performance such as a coil spring, an elastic rubber block, and the like. One end of the elastic stretchable member 900 is connected with the screw-in end of the threaded locking member 800, and the other end is connected with a brake block 910 that is engageable with the annular recess. The brake block 910 is engageable with the annular recess in a rotation direction of the sphere cover 500 parallel to the supporting surface of the base 100 to prevent the rotation. The elastic stretchable member 900 can drive the brake block 910 to be engaged with or to be separate from the annular recess as the movement of the screw-in end.

The threaded locking member 800 cooperates with the threaded hole to control the braking engagement or the separating of the elastic damping member 600 and the sphere 400 through the deformation of the cantilever structure 310.

In the spherical camera disclosed in the embodiment of the present application, the sphere cover 500 is connected to the base 100 through the rotation assembly 200, and is rotatable in a direction parallel to the supporting surface of the base 100 (i.e., P direction). The sphere 400 is hinged in the sphere cover 500, and is rotatable in a direction perpendicular to the supporting surface (i.e., T direction). The threaded locking member 800 can be in thread engagement with the threaded hole on the cantilever structure 310 of the sphere locking frame 300. Screwing in the threaded locking member 800 causes the threaded locking member 800 to pull the cantilever structure 310, and thus causes the cantilever structure 310 to generate a deformation towards the sphere 400. The above deformation of the cantilever structure 310 will press the elastic damping member 600, so that the elastic damping member 60 closely contacts with the sphere 400 to prevent the sphere 400 from rotating in the direction perpendicular to the supporting surface of the base 100. Screwing in the threaded locking member 800 will cause the screw-in end to push toward the elastic stretchable member 900, which will be compressed to drive the brake block 910 to be engaged with the annular recess, and eventually prevent the sphere cover 500 from driving the sphere 400 to rotate relative to the base 100, thereby realizing the rotation locking of the sphere 400 in a direction parallel to supporting surface of the base 100. During the screwing out process of the threaded locking member 800, the actions of the threaded locking member 800 on the cantilever structure 310 and the elastic stretchable member 900 are eliminated, so that the locking is released.

Through the above working process, it can be seen that the user only needs to operate the threaded locking member 800 to achieve the locking or unlocking in the P direction and the T direction, which can achieve the locking control more conveniently compared with the prior art in which the locking or unlocking in the P direction and the T direction is achieved by two locking screws respectively, thus the purpose of improving the locking efficiency is achieved. It can be seen that the spherical camera disclosed in the embodiment of the present application can solve the problem present in the current spherical cameras that it is inconvenient to operate two locking screws to realize the locking operations in the P direction and the T direction.

At the same time, the locking in two directions can be achieved by a threaded locking member 800, which can reduce the number of the threaded locking members 800, and can facilitate to improve the aesthetics of the spherical camera. Moreover, during the locking process, the elastic damping member 600 and the elastic stretchable member 900 are both flexible mechanisms, such that a flexible contact is present in the locking engagement, which can greatly reduce the tolerance precision of the relevant components and improve the manufacturability of the components, which can also allow for a large design change space preserved for subsequent adjustment of the locking force.

Screwing in the screw-in end of the threaded locking member 800 will compress the elastic stretchable member 900, and thus the brake block 910 is driven by the elastic stretchable member 900. In order to improve the driving effect, the spherical camera disclosed in the embodiment of the present application can further include an intermediate moving block 920. The intermediate moving block 920 is slidably provided in the through hole and abuts between the screw-in end of the threaded locking member 800 and the elastic stretchable member 900. The screw-in end of the threaded locking member 800 drives the intermediate moving block 920 to slide in the through hole, and then drives the elastic stretchable member 900 to push the brake block 910 through the intermediate moving block 920. Since the intermediate moving block 920 slides in the through hole, the screw-in end can improve the driving stability to the elastic stretchable member 900 through the intermediate moving block 920.

In order to improve the positioning effect, one end of the brake block 910 may be a brake tip, and the other end is connected with the elastic stretchable member 900, and the brake tip is engaged with the annular recess. Under the push of the elastic stretchable member 900, the brake tip can protrude into the annular recess. The brake tip can improve the accuracy of positioning and engagement, while can also reduce the requirements on the components manufacturing precision during the positioning.

As described above, during the screwing out process of the threaded locking member 800, the force of the threaded locking member 800 on the cantilever structure 310 is eliminated, the cantilever structure 310 is elastically restored, and thus the pressure on the elastic damping member 600 is released, such that the elastic damping member 600 is separated from the sphere 400. With the screwing out of the threaded locking member 800, the screwing out of the screw-in end of the threaded locking member 800 will cause the driving action of the elastic stretchable member 900 on the brake block 910 to be released. Specifically, due to the restoration of the elastic stretchable member 900, the brake block 910 can be detached from the annular recess by its own weight, or under the action of the elastic stretchable member 900 that is driven by the screw-in end. Both of the above cases are the results of the movement of the screw-in end of the threaded locking member 800, which can be considered as driving results achieved by the movement of the screw-in end.

Referring to FIGS. 5-7, in this embodiment of the present application, the inner wall of the sphere cover 500 can be provided with a recess 510. One end of the hinge shaft 410 of the sphere 400 is connected to the sphere 400, and the other end is mounted in the recess 510, so that the sphere 400 is rotatable in the direction perpendicular to the supporting surface of the base 100.

Specifically, the hinge shaft 410 can include a fixed shaft and a rotating shaft. One end of the fixed shaft is clamped in the recess 510. One end of the rotating shaft is rotatably connected with the other end of the fixed shaft. The other end of the rotating shaft is fixedly connected with the sphere 400. Specifically, the fixed shaft and the rotating shaft can be sleeved and engaged so as to form a revolute pair therebetween. In order to improve the compactness of the assembly and reduce the volume of the spherical camera, in an optional solution, the rotating shaft and a part of the fixed shaft can be placed within the sphere 400.

Referring again to FIG. 1, the base 100 is a base of the spherical camera that provides a mounting base for other components. In a specific implementation, the base 100 can include a cylindrical body 110 and a mounting disk 120. The mounting disk 120 is used for achieving the mounting of the entire spherical camera. Generally, an installation space is provided on the mounting disk 120. The mounting disk 120 is provided on a side of the cylindrical body 110 facing away from the sphere 400, and the inner cavity of the cylindrical body 110 is a line accommodating cavity. Cables of the spherical camera can be placed in the line accommodating cavity to hide lines. The rotation assembly 200 is mounted on a side of the cylindrical body 110 facing toward the sphere 400. The rotation assembly 200 is provided with an avoidance hole 210 communicating with the line accommodating cavity, so as not to affect cables threading of the sphere 400 of the spherical camera.

The rotation assembly 200 is a component for achieving the rotation of the sphere 400 parallel to the supporting surface of the base 100. There are many kinds of mechanisms for achieving the functions of the rotation assembly 200. A specific implementation is that the rotation assembly 200 can include a turntable metal plate 220 and a rotating turntable 230, wherein the turntable metal plate 220 is fixed on the cylindrical body 110, the rotating turntable 230 and the cylindrical body 110 constitute a revolute pair, and the rotating turntable 230 is fixedly connected with the sphere locking frame 300. The turntable metal plate 220 can increase the connection strength. Of course, other intermediate connectors can also be used as the connector of the rotation assembly 200.

After the assembly is completed, cables in the line accommodating cavity will be dropped between the sphere 400 and the sphere cover 500 through the cylindrical body 110 and the avoidance hole 210 of the rotation assembly 200, thus the rotation of the sphere 400 would be affected. Based on this, the spherical camera disclosed in the embodiment of the present application can further include a base cover 130. The base cover 130 is fixed on the side of the cylindrical body 110 facing toward the sphere 400 to close the line accommodating cavity, and the base cover 130 is provided with a threading hole 131 communicating with the avoidance hole 210 and the line accommodating cavity. The base cover 130 can prevent the cables from falling out of the line accommodating cavity into the gap between the sphere cover 500 and the sphere 400 without affecting the threading of the cables.

In the embodiment of the present application, the elastic damping member 600 is made of an elastic material, and the elastic damping member may be a silicone rubber damping member.

The sphere cover 500 is used for mounting the sphere 400. Of course, in order not to affect the shooting of the camera lens on the sphere 400, the sphere cover 500 can be provided with an avoidance opening. Since the sphere 400 is rotatable relative to the sphere cover 500, there is a gap therebetween. In order to improve the compactness of the assembly of the spherical camera and to prevent foreign matters from entering into the gap and thus affecting the rotation of the sphere 400, optionally, the spherical camera disclosed in the embodiment of the present application can further include a sphere cover decoration piece 700. As shown in FIG. 1, the sphere cover decoration piece 700 is plugged in a gap between the edge of the avoidance opening and the sphere 400.

In the spherical camera provided by the embodiment of the present application, the rigidity and the magnitude of interference of the elastic damping member 600 and the elastic stretchable member 900 can be adjusted to achieve the purpose of adjusting the magnitude of the locking force, and thus the adjustment between different locking forces can be achieved.

With the development of the society, the use of cameras is more and more extensive. A camera usually includes a light supplement lamp and a lens. The light supplement lamp is used to fill light for the shooting of the lens.

In order to achieve better protection, the camera usually also includes a transparent cover, the transparent cover is covered on the light supplement lamp and the lens. Taking a hemispherical camera as an example, a hemispherical transparent cover is covered on the light supplement lamp and the lens of the hemispherical camera. In the process of working, light generated by the light supplement lamp will enter the lens through the reflection of the transparent cover, which will cause abnormality in the images acquired by the lens. In order to solve this problem, an annular light-blocking separator is provided inside the camera's transparent cover. The annular light-blocking separator is arranged around the lens and engaged with the inner wall of the transparent cover, and finally presents the light of the light supplement lamp from entering into the lens.

With the shooting requirements increase, the view angle of the current lens becomes larger and larger, and the diagonal field of view of the lens increases, eventually resulting in an increase in the size of the annular light-blocking separator. The increase of the size of the annular light-blocking separator would block the light from the light supplement lamp, resulting in that the fill light fails to meet the requirements of shooting.

Referring to FIGS. 10-3, an embodiment of the present application discloses a camera. The camera includes a light-blocking separator 1, a light supplement lamp 2, a transparent cover 7, a front end cover 8 and a lens 9.

The light-blocking separator 1, the front end cover 8, the lens 9, and the light supplement lamp 2 are all located in the transparent cover 7, and the transparent cover 7 plays a role of protection and light transmission. The lens 9 is mounted in the front end cover 8. The front end cover 8 is provided with an avoidance hole for avoiding the lens 9. The front end cover 8 usually covers components that protrude out of a component accommodating cavity formed by a front shell 4 and a base 5 of the camera, playing a role of protection and improving the compactness of the assembly. Some basic components of the camera, such as a main board 6, are provided in the component accommodating cavity of the camera.

The light supplement lamp 2 is provided outside the lens 9 and used to fill light for the shooting of the lens 9. The light-blocking separator 1 surrounds the outside of the lens 9. The light-blocking separator 1 is clamped between the front end cover 8 and the transparent cover 7, so as to separate the light supplement lamp 2 and the lens 9. The light-blocking separator 1 has a rectangular cross section. It should be noted that the light-blocking separator 1 surrounds the periphery of the lens 9, and the cross section of the light-blocking separator 1 is a plane that is cut parallel to the surrounding direction of the light-blocking separator 1 and has a rectangular shape.

In the camera provided in the embodiment of the present application, the annular light-blocking separator is changed to a light-blocking separator 1 with a square cross section. As the field of view increases, within the same installation space, on the premise of meeting the field of view, the light-blocking separator 1 with a square cross section occupies a smaller area, and would not block the light from the light supplement lamp 2, thus would not affect the normal operation of the camera. It can be seen that the camera disclosed in the embodiment of the present application can solve the problem present in the current cameras that the light-blocking separator affects the fill light in the case that the field of view of the lens increases.

Take the lens 9 as an ultra-wide-angle lens as an example, the diagonal field of view of the ultra-wide-angle lens can reach 200°, and the horizontal field of view can reach 150°. If an annular light-blocking separator is used, the size of the annular light-blocking separator inevitably increases as the diagonal field of view increases. The annular light-blocking separator whose size is increased would block the light from the light supplement lamp. The light-blocking separator closely contacts with the transparent cover, and an edge closer to the light supplement lamp can be referred to as a target edge. Through the verification through simulation technology, an angle between the light projection direction of the light supplement lamp 2 and a line connecting the light source center of the light supplement lamp 2 and the target edge should not be less than 30° to ensure the well effect of filling light of the light supplement lamp 2. For ease of description, the above angle is referred to as an avoidance light angle. The avoidance light angle between the annular light-blocking separator with an enlarged size and the light supplement lamp 2 can only reach 25°, and the light from the light supplement lamp is blocked severely, failing to meet the requirements of fill light.

The light-blocking separator 1 with a rectangular cross section disclosed in the embodiment of the present application can reduce the size of the light-blocking separator 1 within the same installation space. The diagonal of the rectangular cross section can meet the requirement of 200° diagonal field of view for an ultra-wide-angle lens. The length direction of the rectangular cross section can meet the requirement of 150° horizontal field of view for an ultra-wide-angle lens. This light-blocking separator 1 with rectangular cross section corresponds to a rectangle internally tangent to the annular light-blocking separator within the same installation space, which can reduce the light blocking of the light supplement lamp. Referring to FIG. 12, which is an enlarged diagram of the light supplement lamp on the left side and structures around the light supplement lamp in FIG. 11. After verification, under the premise that the lens 9 is an ultra-wide-angle lens, the shielding angle of the camera disclosed in the embodiment of the present application can reach 38° which has exceeded 30°, thereby achieving a better fill light effect.

A front end plate may be provided on the outer side of the front end cover 8, and the light supplement lamp 2 can be mounted on the front end plate. The front end plate may be a PCB plate that passes through the side wall of the front end cover 8 and is electrically connected with a power supply assembly inside the front end cover 8, thus power supply can be directly introduced from the inside of the camera.

The camera disclosed in the embodiment of the present application can further include a lamp cover 3, which is covered above the light supplement lamp 2. Generally, there are a plurality of light supplement lamps 2 which are distributed and spaced on certain circumferential installation positions outside of the lens 9. In this case, the lamp cover 3 also has an annular structure, and thus can be entirely covered above the plurality of light supplement lamps 2. Currently, light supplement lamps of some cameras use traditional lamp cups and decorative covers to cover the light supplement lamps 2. The above structure has a problem of too many components and relatively complicated installation. The lamp cup and decorative cover are overlapped in the projection direction of the lens 9, and then occupy a large space in this direction, such that the light supplement lamp 2 cannot be closer to the front lens of the camera, resulting in a smaller shielding angle. A lamp cover 3 using a single structure can be more easily designed to a smaller volume, which reduces the occupation of the above space and also facilitates installation. Preferably, in the embodiment of the present application, the light supplement lamp 2 may be an infrared light supplement lamp.

The light-blocking separator 1 is clamped between the front end cover 8 and the transparent cover 7. To improve the separating effect, the light-blocking separator 1 is usually made of a material with better elasticity, that is, the light-blocking separator 1 can be an elastic light-blocking member. The elastic light-blocking member can achieve a better separating effect through elastic deformation and prevent light from exiting out of the contact surface between the transparent cover 7 and the light-blocking separator 1. Specifically, the light-blocking separator 1 may be an EVA (ethylene-vinyl acetate copolymer) structural member.

The camera disclosed in the embodiment of the present application may be a hemispherical camera. In this case, the transparent cover 7 is a hemispherical transparent cover, as shown in FIG. 11. Of course, the camera disclosed in the embodiment of the present application is not limited to a hemispherical camera, and is also applicable to other types of cameras that use an annular light-blocking separator that may block the fill light of the light supplement lamp due to its enlarged size.

After verification, the field of view of the camera disclosed in the embodiment of the present application can reach 150° or more, which meets the requirements for the wide angle performance of the camera on the market.

The present application provides an embodiment using the following technical solutions:
a camera including a transparent cover, a front end cover, a lens, a light supplement lamp, and a light-blocking separator, wherein the front end cover, the lens, the light supplement lamp, and the light-blocking separator are all located in the transparent cover; the lens is mounted in the front end cover; the front end cover is provided with an avoidance hole for avoiding the lens; the light supplement lamp is provided outside the lens; the light-blocking separator surrounds the outer side of the lens and is clamped between the front end cover and the transparent cover to separate the light supplement lamp and the lens; the cross section of the light-blocking separator has a rectangular inner profile shape.

Optionally, in the above camera, a front end plate is provided on the outer side of the front end cover, and the light supplement lamp is mounted on the front end plate.

Optionally, in the above camera, the front end plate is a PCB plate that passes through the side wall of the front end cover and is electrically connected with a power supply assembly inside the front end cover.

Optionally, in the above camera, a lamp cover is further included, and the lamp cover is covered above the light supplement lamp.

Optionally, in the above camera, the light supplement lamp is an infrared light supplement lamp.

Optionally, in the above camera, the light-blocking separator is an elastic light-blocking member.

Optionally, in the above camera, the light-blocking separator is a EVA structural member.

Optionally, in the above camera, the transparent cover is a hemispherical transparent cover.

In the camera disclosed in the embodiment of the present application, the annular light-blocking separator is changed to a light-blocking separator with a square cross section. As the field of view increases, the light-blocking separator with a square cross section would not block the light from the light supplement lamp, thus would not affect the normal operation of the camera. It can be seen that the camera disclosed in the embodiment of the present application can solve the problem present in the current cameras that the light-blocking separator affects the fill light in the case that the field of view of the lens increases. Herein, technical features in various optional solutions can be combined to form a solution as long as no conflict is present, and these solutions are all within the scope of the disclosure of the present application.

Herein, the description of each optional solution only focuses on the difference from other optional solutions. Each optional solution can be arbitrarily combined as long as no conflict is present. The embodiments formed after the combination are also within the scope of the disclosure of this specification. Considering the conciseness of the text, embodiments formed by the combination will not be separately described herein.

The embodiments described above are simply preferable embodiments of the present application, and are not intended to limit the present application. Any modifications, alternatives, improvements, or the like within the spirit and principle of the present application shall be included within the scope of protection of the present application.

What is claimed is:

1. A spherical camera, comprising a base, a rotation assembly, a sphere locking frame, a sphere and a sphere cover, wherein the sphere cover is connected to the base through the rotation assembly, and is rotatable relative to the base in a direction parallel to a supporting surface of the base; the sphere is hinged in the sphere cover and is rotatable in a direction perpendicular to the supporting surface; the sphere locking frame is provided on the rotation assembly and an elastic damping member is provided between the sphere and the sphere locking frame.

2. The spherical camera according to claim 1, wherein the spherical camera further comprises a hinge shaft; an inner wall of the sphere cover is provided with a recess, and one end of the hinge shaft is connected to the sphere, and the other end is mounted in the recess, so as to cause the sphere to rotate in the direction perpendicular to the supporting surface.

3. The spherical camera according to claim 2, wherein the hinge shaft comprises a fixed shaft and a rotating shaft, one end of the fixed shaft is clamped in the recess, and one end of the rotating shaft is rotatably connected with the other end of the fixed shaft, and the other end of the rotating shaft is fixedly connected with the sphere.

4. The spherical camera according to claim 3, wherein the rotating shaft and a part of the fixed shaft are placed within the sphere.

5. The spherical camera according to claim 1, wherein the base comprises a cylindrical body and a mounting disk; and the mounting disk is provided on a side of the cylindrical body facing away from the sphere, an inner cavity of the cylindrical body is a line accommodating cavity.

6. The spherical camera according to claim 5, wherein the rotation assembly is mounted on a side of the cylindrical body facing toward the sphere, and the rotation assembly is provided with an avoidance hole communicating with the line accommodating cavity.

7. The spherical camera according to claim 6, wherein the rotation assembly comprises a turntable metal plate and a rotating turntable, the turntable metal plate is fixed on the cylindrical body, the rotating turntable and the cylindrical body forms a revolute pair, and the rotating turntable is fixedly connected with the sphere locking frame, or wherein, it further comprises a base cover that is fixed on a side of the cylindrical body facing toward the sphere to close the line accommodating cavity, the base cover is provided with a threading hole communicating with the avoidance hole and the line accommodating cavity.

8. The spherical camera according to claim 1, wherein the spherical camera further comprises a sphere cover decoration piece, the sphere cover is provided with an avoidance opening for avoiding a camera lens of the sphere, and the sphere cover decoration piece is plugged in a gap between the edge of the avoidance opening and the sphere, or wherein the elastic damping member is a silicone rubber damping member.

9. The spherical camera according to claim 1, wherein one end of the sphere locking frame is fixed on the rotation assembly, and the other end is a cantilever structure; the elastic damping member is provided between the cantilever structure and the sphere; a threaded locking member is provided on the sphere cover, and the cantilever structure is provided with a threaded hole that is in thread engagement with the threaded locking member; and the base is provided with an annular recess; the rotation assembly is provided with a through hole, within which an elastic stretchable member is provided; one end of the elastic stretchable member is connected with a screw-in end of the threaded locking member, and the other end is connected with a brake block that is engageable with the annular recess, the brake block and the annular recess can be positioned in a rotation direction of the sphere cover parallel to the supporting surface; with the movement of the screw-in end, the elastic stretchable member can drive the brake block to be engaged with the annular recess or to be separate from the annular recess; the threaded locking member cooperates with the threaded hole to control a braking engagement or separating of the elastic damping member and the sphere through deformation of the cantilever structure.

10. The spherical camera according to claim 9, wherein it further comprises an intermediate moving block, the intermediate moving block is slidably provided in the through hole and abuts between the screw-in end and the elastic stretchable member.

11. The spherical camera according to claim 9, wherein the elastic stretchable member is a coil spring.

12. The spherical camera according to claim 9, wherein an inner wall of the sphere cover is provided with a recess, and one end of a hinge shaft of the sphere is connected to the sphere, and the other end is mounted in the recess, so as to cause the sphere to rotate in the direction perpendicular to the supporting surface.

13. The spherical camera according to claim 12, wherein the hinge shaft comprises a fixed shaft and a rotating shaft, one end of the fixed shaft is clamped in the recess, and one end of the rotating shaft is rotatably connected with the other end of the fixed shaft, and the other end of the rotating shaft is fixedly connected with the sphere.

14. The spherical camera according to claim 13, wherein the rotating shaft and a part of the fixed shaft are placed within the sphere.

15. The spherical camera according to claim 9, wherein the base comprises a cylindrical body and a mounting disk; and the mounting disk is provided on a side of the cylindrical body facing away from the sphere, an inner cavity of the cylindrical body is a line accommodating cavity.

16. The spherical camera according to claim 15, wherein the rotation assembly is mounted on a side of the cylindrical body facing toward the sphere, and the rotation assembly is provided with an avoidance hole communicating with the line accommodating cavity.

17. The spherical camera according to claim 16, wherein the rotation assembly comprises a turntable metal plate and a rotating turntable, the turntable metal plate is mounted on the cylindrical body, the rotating turntable and the cylindrical body forms a revolute pair, and the rotating turntable is fixedly connected with one end of the sphere locking frame.

18. The spherical camera according to claim 15, wherein it further comprises a base cover that is fixed on a side of the cylindrical body facing toward the sphere to close the line accommodating cavity, the base cover is provided with a threading hole communicating with the avoidance hole and the line accommodating cavity.

19. The spherical camera according to claim 9, wherein it further comprises a sphere cover decoration piece, the sphere cover is provided with an avoidance opening for avoiding a camera lens of the sphere, and the sphere cover decoration piece is plugged in a gap between the edge of the avoidance opening and the sphere, or wherein the elastic damping member is a silicone rubber damping member.

20. The spherical camera according to claim 9, wherein one end of the brake block is a brake tip, the other end is connected with the elastic stretchable member, and the brake tip is engageable with the annular recess.

* * * * *